UNITED STATES PATENT OFFICE.

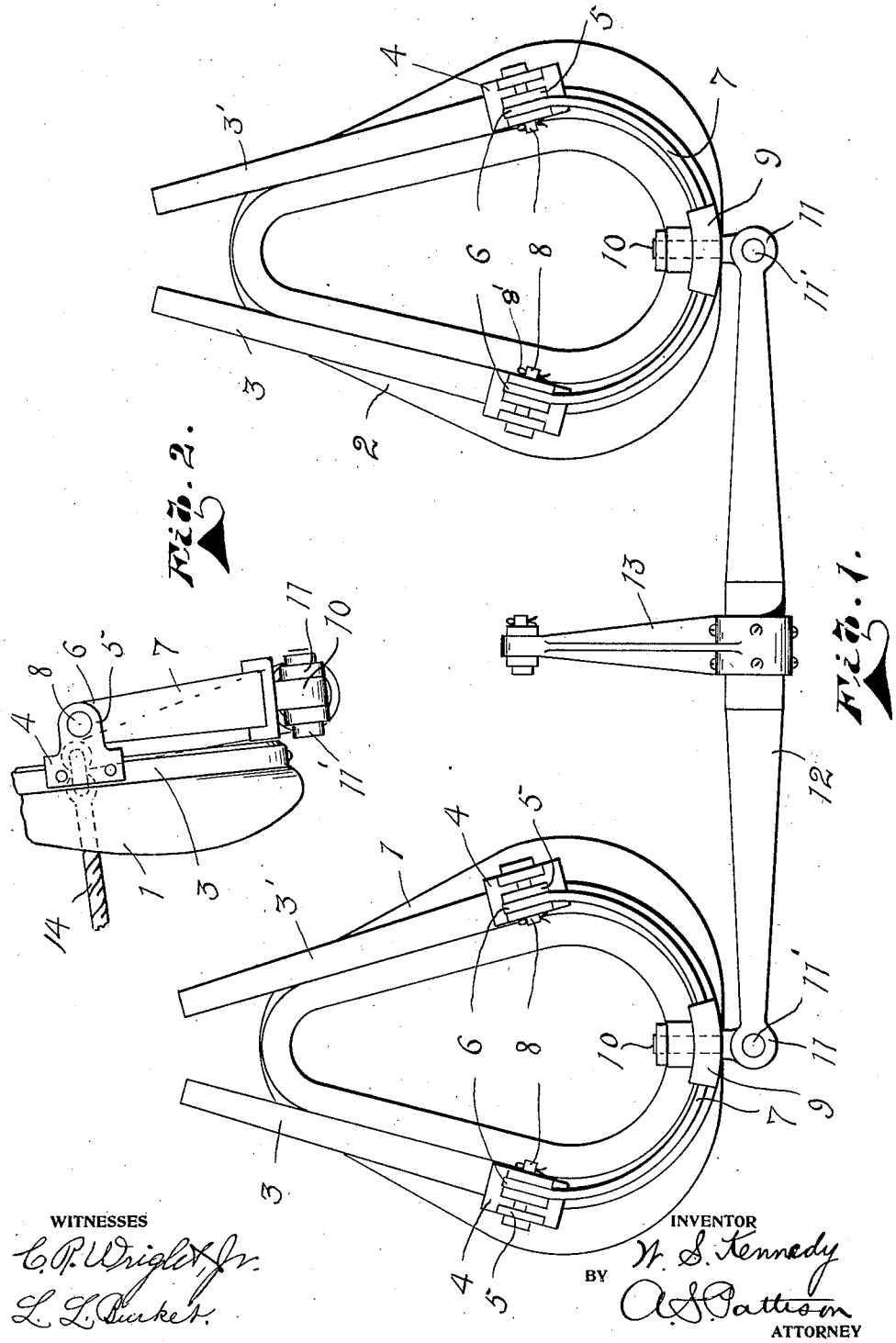

WALTER S. KENNEDY, OF DULUTH, MINNESOTA.

HARNESS.

1,094,337.  Specification of Letters Patent.  Patented Apr. 21, 1914.

Application filed July 18, 1912.  Serial No. 710,311.

*To all whom it may concern:*

Be it known that I, WALTER S. KENNEDY, a citizen of the United States, residing at Duluth, in the county of St. Louis and State of Minnesota, have invented certain new and useful Improvements in Harnesses, of which the following is a specification, reference being had therein to the accompanying drawing.

My invention relates to improvements in harnesses, and pertains particularly to team harnesses.

The object of my invention is to provide a team harness in which a single draft line is used and whereby maximum freedom of action is given to the horse and at the same time having a line of draft in relation to the horse's shoulder, the same as is used with double harnesses.

Another object of my invention is to provide a simple, cheap and effective device of this character.

In the accompanying drawings—Figure 1 is a front elevation of my improved harness as it is applied to a pair of ordinary horse collars. Fig. 2 is a side elevation of Fig. 1.

Referring now to the drawings, 1 and 2 represent the two collars upon which are attached in the ordinary manner, the hames 3 and 3'. These hames, as shown, are of the ordinary structure, but instead of having the usual trace connections are provided at such a point with rigid forwardly projecting brackets 4. These brackets, as shown in Fig. 1 of the drawings, are formed with a plurality of forwardly extending lugs 5, which are spaced apart. Between said lugs the ends 6 of the yoke 7 extend and are pivotally secured between the lugs by means of a bolt or pin 8, said bolt being held in position by means of a cotter pin 8'. These yokes 7, as shown, are of the U-shape form and of a shape to conform with the lower ends of the hames 3. The plurality of lugs 5 are for the purpose of lateral adjustment of the yokes so as to suit different sized collars.

The yoke 7, as heretofore stated, is of a U-shape and made of a strong continuous piece of metal having at its intermediate portion a hub 9 rigid therewith. Pivotally supported within said hub 9 is an eye-bolt 10, the said bolt preferably passing through both the yoke and hub forming a joint therewith. The lower end of the eye-bolt 10 passes between the bifurcated ends 11 of the draft evener 12, and passing through the said evener and the eye-bolt 10 is a bolt or pin 11', whereby the evener is pivotally connected to the yoke and having a movement at right angles to the eye-bolt 10 in the hames. The evener 12, intermediate its end is provided with a draft arm 13 which extends upwardly and slightly inclined and to which the draft chain or rope 14 is attached. The free end of the arm 13, to which the draft chain 14 is attached is in a line slightly above the point of draft of the yokes 7 with the hames, so that when a strain is applied to the harness the yokes 7 will swing slightly forwardly and clear of the hames and collar and thus bring little or no friction upon them. The draft upon the cable 14, as heretofore stated, swings the yokes 7, upwardly and the draft is at exactly the same point on the hames as it is when the double traces are used.

Having thus described my invention, what I claim and desire to secure by Letters Patent is:

In a team harness, the combination with two sets of hames, each hame having a series of ears in approximately horizontal alinement, of yokes adapted to be pivotally secured between any two of the series of ears, hubs carried by the lower ends of the yokes, eye-bolts pivotally mounted in said hubs and extending below the lower ends of the hames, an evener having its ends pivotally connected to the eye-bolts, a draft arm rigidly secured to the evener midway its connections with the yokes and extending upwardly, and a pivotal draft connection carried by the draft arm above a horizontal plane passing through the pivotal connections between the yokes and the hames.

In testimony whereof I hereunto affix my signature in the presence of two witnesses.

WALTER S. KENNEDY.

Witnesses:
 NORMAN E. LAMAND,
 S. GEO. STEVENS.

Copies of this patent may be obtained for five cents each, by addressing the "Commissioner of Patents, Washington, D. C."